US011822769B2

(12) United States Patent
Guezelarslan et al.

(10) Patent No.: US 11,822,769 B2
(45) Date of Patent: Nov. 21, 2023

(54) RADAR TARGET SIMULATOR

(71) Applicant: Rohde & Schwarz GmbH & Co. KG, Munich (DE)

(72) Inventors: Baris Guezelarslan, Munich (DE); Dominik Hettich, Munich (DE); Yassen Mikhailov, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 643 days.

(21) Appl. No.: 16/900,044

(22) Filed: Jun. 12, 2020

(65) Prior Publication Data
US 2021/0389421 A1    Dec. 16, 2021

(51) Int. Cl.
| | |
|---|---|
| *G06F 3/0484* | (2022.01) |
| *G01S 7/22* | (2006.01) |
| *G06F 3/0488* | (2022.01) |
| *G06F 3/04815* | (2022.01) |
| *G06F 3/048* | (2013.01) |
| *G06F 3/023* | (2006.01) |
| *G01S 7/40* | (2006.01) |

(52) U.S. Cl.
CPC .............. *G06F 3/0484* (2013.01); *G01S 7/22* (2013.01); *G06F 3/0236* (2013.01); *G06F 3/048* (2013.01); *G06F 3/0488* (2013.01); *G06F 3/04815* (2013.01); *G01S 7/4052* (2013.01)

(58) Field of Classification Search
CPC ...... G06F 3/0484; G06F 3/0236; G06F 3/048; G06F 3/0488; G01S 7/22; G01S 7/4052
See application file for complete search history.

(56) References Cited

U.S. PATENT DOCUMENTS

| | | | | |
|---|---|---|---|---|
| 5,807,109 A | * | 9/1998 | Tzidon .................... | G09B 9/40 434/30 |
| 2009/0322695 A1 | * | 12/2009 | Cho ....................... | G06F 3/0488 345/173 |

FOREIGN PATENT DOCUMENTS

CN             107505617 A     12/2017

\* cited by examiner

*Primary Examiner* — Lisa S Landis
(74) *Attorney, Agent, or Firm* — CHRISTENSEN O'CONNOR JOHNSON KINDNESS PLLC

(57) ABSTRACT

A radar target simulator for simulating a radar target is disclosed. The radar target simulator comprises a display module and an input module via which a user of the radar target simulator is enabled to define a target to be simulated. The radar target simulator also comprises a processing module that is connected with the display module and the input module in a signal transmitting manner. The display module and the processing module together provide a graphical user interface for the user of the radar target simulator. The graphical user interface provides a two-dimensional representation of an at least two-dimensional space. The processing module receives at least one input signal from the input module based on an input of the user. The input of the user is associated with input coordinates in the two-dimensional representation. The processing module processes the at least one input signal, thereby generating a symbol of the target defined. The display module illustrates the symbol generated in the two-dimensional representation provided by the graphical user interface.

18 Claims, 3 Drawing Sheets

- state of the art -

RADAR TARGET SIMULATOR

FIELD OF THE DISCLOSURE

Embodiments of the present disclosure relate to a radar target simulator for simulating a radar target.

BACKGROUND

Radar target simulators are typically used to characterize and evaluate a radar device such as a radar sensor that is used in a vehicle. Those radar target simulators are also called automotive radar echo generators (AREGs) as they are used for testing automotive radar sensors. However, radar devices can also be used in other technical fields. Therefore, the radar target simulators are used for testing different kinds of radar devices.

The radar target simulators known in the state of the art typically comprise a graphical user interface that provides column-like lists that are used to define a respective target to be simulated in order to test the radar device according to a certain target scenario. For instance, the radar target simulators known so far are enabled to simulate four different targets, also called objects, while providing four column-like lists. The respective properties of these targets can be defined by inputting a certain value for a certain property in the rows of these column-like lists. For instance, the range, the speed and/or a radar cross section of the target to be simulated is inputted for defining the respective targets.

Alternatively, it is known that a dropdown menu is provided via which a user of the radar target simulator is enabled to select a certain setting/property in order to define the target to be simulated by the radar target simulator for testing the radar device.

However, it is necessary to be an expert or to have at least certain experience in using the radar target simulators known in the state of the art in order to ensure that the respective simulators are operated correctly.

Accordingly, there is a need for a radar target simulator that can be operated in an easy manner.

SUMMARY

The present disclosure provides examples of a radar target simulator for simulating a radar target. In an embodiment, the radar target simulator comprises a display, such as a display module, and an input, such as an input module, via which a user of the radar target simulator is enabled to define a target to be simulated. The radar target simulator also comprises a processing circuit or module that is connected with the display module and the input module in a signal-transmitting manner. The display module and the processing module together provide a graphical user interface (GUI) for the user of the radar target simulator. The graphical user interface provides a two-dimensional representation of an at least two-dimensional space. The processing module receives at least one input signal from the input module based on an input of the user. The input of the user is associated with input coordinates in the two-dimensional representation. The processing module processes the at least one input signal, thereby generating a symbol of the target defined. The display module illustrates the symbol generated in the two-dimensional representation provided by the graphical user interface.

Accordingly, the radar target simulator ensures an easy and intuitive operation/control of the radar target simulator such that a user having less experience is enabled to use the radar target simulator in order to define a certain target to be simulated for testing a radar device, for example a target scenario with different targets. In some embodiments, the radar target simulator, for example the processing module together with the display module, ensures that an editor is provided for defining the respective target scenario, namely the at least one target to be simulated. The editor corresponds to a WYSIWYG-editor, namely a "What You See Is What You Get"-editor.

The graphical user interface providing the two-dimensional representation illustrates an overview that corresponds to an overview known from a measurement performed by the radar device to be tested.

Therefore, the user is enabled to easily and intuitively define or rather set the target to be simulated based on the knowledge the user might have with radar measurements in general.

An aspect provides that the symbol of the target to be simulated in the graphical user interface provides a graphical feedback to the user concerning the definition of the target to be simulated. In some embodiments, the graphical feedback is ensured due to the fact that the two-dimensional representation is provided wherein the target to be simulated is also graphically illustrated in the two-dimensional representation such that the user of the radar target simulator gathers the graphical feedback.

Further, the two-dimensional representation may correspond to an overview that is typically provided by a measurement performed by the radar device. Hence, the user is enabled to easily obtain the respective information and to define the target to be simulated in an intuitive manner.

Another aspect provides that the graphical user interface together with the processing module ensures that the user of the radar target simulator is enabled to generate the target to be simulated in a graphical manner. As such, it is not necessary for the user to input any values concerning properties of the target to be simulated since this is done in a graphical manner by positioning the symbol of the target to be simulated in the two-dimensional representation. In some embodiments, the user is enabled to move the symbol within the two-dimensional representation such that the properties of the target to be simulated are set accordingly.

In some embodiments, the symbol can be positioned along one axis of the two-dimensional representation in order to set a property of the target to be simulated that corresponds to the dimension associated that axis. Moreover, the symbol may be positioned simultaneously along two axes, namely within the two-dimensional representation, in order to set two properties of the target to be simulated simultaneously.

Another aspect provides that the input module enables to adjust at least one property of the target to be simulated. By interacting with the input module, the user is enabled to set and/or modify a property of the target to be simulated. The respective property can be adjusted by interacting with the input module accordingly such that a target to be simulated can be defined easily. As mentioned above, this is done in an intuitive manner by positioning the symbol within the two-dimensional representation.

For instance, the input module enables to adjust at least one property of the target to be simulated during a simulation or a measurement. The user is enabled to make adaptions during the simulation of a certain target or rather a measurement of the radar device by using the radar target simulator. Accordingly, a certain behavior of the target to be simulated can be adapted when testing the radar device, for instance a spontaneous movement or rather any other interaction of the target may be set which may also occur in real life.

In some embodiments, at least one property of the target to be simulated may be defined by coordinates of the symbol within the two-dimensional representation. As already mentioned above, the position of the symbol representing the target to be simulated has an effect on at least one property of the target to be simulated. Therefore, the two-dimensional representation is associated with at least one dimension that has an influence on the property of the target to be simulated. In other words, a certain position of the symbol along this specific dimension influences a respective property of the target accordingly.

For instance, at least one property of the target to be simulated is one of the following: radar cross section (RCS) of the target, target enabling, target disabling, track target, distance or range, velocity or Doppler, azimuth, and elevation. The respective properties of the target to be simulated can be set accordingly via the input module. For instance, the distance or range and/or the velocity or Doppler may be set by positioning the symbol representing the target to be simulated within the two-dimensional representation provided that the dimensions of the two-dimensional representation are associated with the distance or range and/or the velocity or Doppler. Further, enabling or disabling the respective target can be easily done by marking/selecting the symbol graphically illustrated by the input module, for instance by tipping or clicking on the symbol illustrated.

The respective target, for example the properties of which shall be adapted, can be selected/marked using the input module. Generally, selecting or marking the symbol may be done via clicking or tipping.

For instance, the distance or range, velocity or Doppler, azimuth, or elevation of the target to be simulated is set by the position of the symbol in the two-dimensional representation. As mentioned above, at least one property of the target is defined by the coordinates of the symbol within the two-dimensional representation. Hence, one of the above-mentioned properties is set by the position of the symbol. The two-dimensional representation has at least one dimension that corresponds/is associated with the distance or range, velocity or Doppler, azimuth, or elevation.

Another aspect provides that a movement of the target to be simulated is set by moving the symbol of the target to be simulated within the two-dimensional representation, thereby generating a track representing the movement. The target to be simulated, namely the symbol representing the target to be simulated, can be selected/marked by the input module. Once the symbol is selected/marked, the symbol can be moved within the two-dimensional representation wherein the respective movement of the symbol within the two-dimensional representation corresponds to a simulated movement of the target along the dimension(s) of the two-dimensional representation. Accordingly, a movement of the target can be set easily and intuitively.

Furthermore, the processing module may be configured to generate parameters that define the target to be simulated. Hence, the processing module is enabled to derive parameters concerning the target to be simulated based on the position of the symbol within the two-dimensional representation wherein the position is associated with at least one property. The processing module may take further settings into account that together with the at least one property are used in order to achieve the respective parameters.

The graphical user interface may be a bidirectional graphical user interface as the graphical user interface simultaneously provides an input interface and an output interface. The graphical user interface is used to inform the user (output interface) wherein the same graphical user interface can be used to input certain settings (input interface). Therefore, the user is enabled to directly interact with the graphical user interface such that the user is enabled to make certain inputs via the graphical user interface.

Accordingly, the input module may be integrated within the display module. Therefore, the user is enabled to interact with the display module in order to make some inputs that are processed to define the target(s) to be simulated. The processing module that is connected with the display module is also connected with the input module (simultaneously or rather via the same connection).

For instance, the display module comprises a touchscreen or touch-sensitive display. Therefore, the user is enabled to directly interact with the display module in order to control the graphical user interface illustrated by the display module. For this purpose, the user simply touches the touch-sensitive display of the display module. In some embodiments, the user is enabled to set the target to be simulated in an easy and intuitive manner by simply touching a location on the display, namely a location within the two-dimensional representation illustrated by the touch-sensitive display. The location touched corresponds to the position of the symbol illustrated within the two-dimensional representation.

Furthermore, the user can interact with the display module, for example the touch-sensitive display, in order to adapt certain properties of the target to be simulated, for instance the radar cross section.

In some embodiments, the user can interact with the display module, for example the touch-sensitive display, in order to adapt the position of the symbol representing the target to be simulated which has an influence on the properties of the target to be simulated. For instance, the user is enabled to define start and stop coordinates of the target to be simulated by simply marking/selecting positions within the two-dimensional representation in order to define a movement of the target. The movement of the target may relate to a movement in space, an acceleration, a deceleration and/or a varying radar cross section of the target to be simulated. This typically depends on the dimensions used for the two-dimensional representation illustrated.

The touch-sensitive display may provide the input module such that the user touches a location on the touch-sensitive display. The location touched is sensed by the touch-sensitive display, thereby generating the at least one input signal that is received by the processing module which processes the at least one input signal, thereby generating the symbol of the target defined which is illustrated in the graphical user interface.

Accordingly, the user simply interacts with the display module, namely the touch-sensitive display, in order to define a target to be simulated. The processing module obtains a respective input signal depending on the position of the location touched by the user. The processing module processes the respective information such that at least one property of the target to be simulated is set due to the position of the symbol within the two-dimensional representation.

Another aspect provides that the input module comprises a pointing device. The pointing device is used to interact with the graphical user interface, for example in case of a non-touch-sensitive display that can be touched easily.

The pointing device may be separately formed, wherein a movement of the pointing device is tracked by the processing module that generates a pointer or cursor illustrated in the two-dimensional representation. The pointing device may be established by a separately formed device, for instance a mouse, that is controlled by the user. Alternatively, the pointing device may also relate to knob(s), button(s) or similar that are provided on a housing of a main device of the radar target simulator.

In any case, a movement of the pointing device, for instance the separately formed mouse, results in an input signal that is processed by the processing module. The respective movement is illustrated in the graphical user interface by the pointer or cursor that moves in the graphical user interface provided accordingly. Hence, the respective movement may be initiated by the user that interacts with the pointing device.

The user is also enabled to perform actions like clicking, thereby generating the input signal which is processed by the processing module in a certain way, for example by marking a position in the two-dimensional representation or selecting an already defined target illustrated in the two-dimensional representation. The already illustrated target that is marked/selected may be enabled or rather disabled by the clicking in an easy and intuitive manner.

Another aspect provides that the radar target simulator is a hand-held device. Therefore, the user is enabled to easily interact with the radar target simulator, namely by interacting with the graphical user interface.

In some embodiments, the hand-held device ensures that a target scenario can be set by a thumb of the user that is used to interact with the touch-sensitive display in order to define the at least one target used for testing the radar device.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
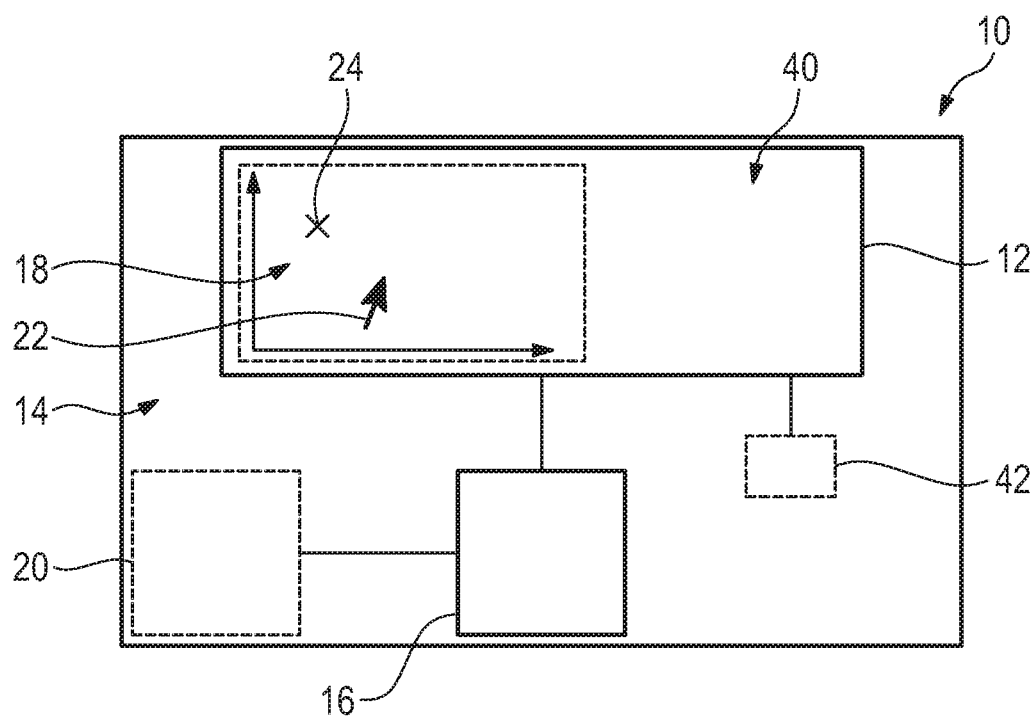
FIG. 1 shows a representative radar target simulator of the present disclosure in a schematic overview.

In FIG. 1, a radar target simulator 10 is shown that is used for simulating at least one radar target, also called object. The at least one radar target is simulated for testing a radar device with respect to its characteristics in a certain target scenario applied. Generally, a target scenario may be set appropriately by defining several targets that are used for testing the radar device to be tested.

The radar target simulator 10 comprises a display, such as display module 12, an input, such as input module 14, as well as a processing circuit or module 16.

In the shown embodiment, the processing module 16 is connected with the display module 12 and the input module 14 in a signal transmitting manner such that input signals received from the input module 14 are processed by the processing module 16. Further, results of the processing of the input signal is forwarded from the processing module 16 to the display module 12 for illustrative purposes such that the user obtains a graphical feedback concerning the inputs made as will be described later in more detail.

FIG. 1 depicts a graphical user interface 18 displayed by the display module 12 for the user of the radar target simulator 10. The graphical user interface 18 is generated by the processing module 16. Accordingly, the processing module 16 together with the display module 12 provides the graphical user interface 18.

In some embodiments, the graphical user interface 18 illustrates a two-dimensional representation of an at least two-dimensional space. Therefore, two axes are shown in the graphical user interface 18 that correspond to the two dimensions.

In the shown embodiment, the input module 14 comprises a pointing device 20 that is established separately with respect to the display module 12, for instance by knobs, buttons, a mouse, or similar. Hence, the user of the radar target simulator 10 interacts with the input module 14 in order to move a pointer or cursor 22 illustrated in the two-dimensional representation appropriately. The processing module 16 generates the pointer or cursor 22 while processing the inputs made via the input module 14. Accordingly, the pointer or cursor 22 can be moved to a certain position at which an action can be performed, for instance a clicking action, in order to define a target to be simulated, namely at least one property of the target to be simulated.

The processing module 14 generates a symbol 24 of the target defined within the two-dimensional representation at a certain position. The position of the symbol 24, namely its coordinates, already defines at least one property of the target to be simulated. The respective property defined depends on the dimensions that are associated with the axes of the two-dimensional representation.

For instance, the axes of the two-dimensional representation are associated with probabilities of the target to be simulated such as distance or range, velocity or Doppler, azimuth, or elevation. Accordingly, the distance or range, the velocity or Doppler, azimuth and/or elevation of the target to be simulated may be set by the user via the input module 14 when positioning the symbol 24 of the target to be simulated at certain coordinates within the two-dimensional representation illustrated by the graphical user interface 18.

In other words, the at least two-dimensional space that is illustrated by the two-dimensional representation may be associated with two of the following dimensions: distance or range, velocity or Doppler, azimuth, and elevation.

Since the target to be simulated can be at least partly defined by positioning the symbol 24, the graphical user interface 18 together with the processing module 16 ensures that the user of the radar target simulator 10 can generate the target to be simulated in a graphical manner. The target can be generated graphically since the symbol 24 representing the target to be simulated is positioned at certain coordinates that in turn define at least one property of the target to be simulated.

Moreover, the user is enabled to adjust at least one property of the target to be simulated, namely by interacting with the input module 14. Hence, the symbol 24 may be re-positioned, resulting in adapted properties of the target to be simulated. The respective adaption may be done during a simulation of the target, for example during a measurement of the radar device when using the radar target simulator 10.

Generally, the processing module 16 generates parameters that define the target to be simulated. The parameters may be associated with the property/properties defined by using the input module 14. Moreover, further settings may be taken into account besides the property/properties in order to achieve the parameters used for simulating the target(s) for testing the radar device to be tested by the radar target simulator 10.

Figures 4, 5:
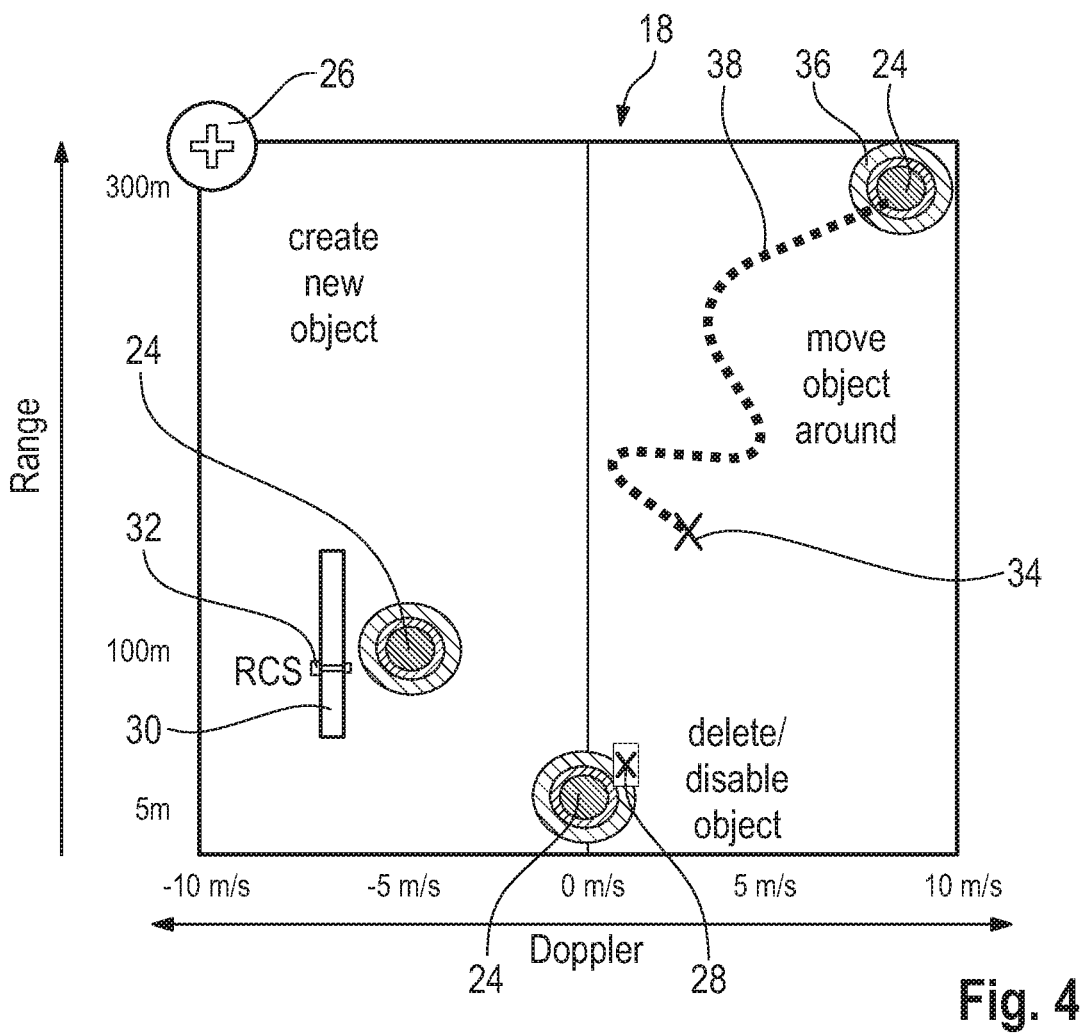
FIG. 4 shows a graphical user interface provided by the radar target simulator according to an embodiment of the present disclosure.
FIG. 5 shows a graphical user interface provided by a radar target simulator known in the state of the art.

Besides the properties mentioned above, a radar cross section (RCS) of the target, an enabling of the target, a disabling of the target, a track of the target, the distance or the range, the velocity or the Doppler, azimuth, and/or elevation may be set via the input module 14. This is shown in FIG. 4 that illustrates the graphical user interface 18 used for defining at least one target to be simulated for testing a radar device.

The enabling or disabling of an already defined target to be simulated may be done by controlling the pointing device 20 such that the pointer or cursor 22 is moved to the respective target already defined, namely the respective symbol 24, and performing a certain action like a clicking so as to active or deactivate the target. The enabling is represented by a "+"-symbol 26, whereas the disabling is represented by an "x"-symbol 28.

The radar cross section of the target may be set in a similar manner. The pointing device 20 is controlled such that the pointer or cursor 22 is moved to the respective target already defined. Then, a slide bar 30 provided is used to set the radar cross section in a desired manner A control element 32 illustrated in the slide bar 30 may be moved graphically while interacting with the pointing device 20. In addition to the control element 32 moved graphically, the symbol 24 of the target to be simulated may alter its appearance, thereby illustrating the amended RCS accordingly. For instance, the color(s) and/or the size of the symbol 24 may change.

The movement of the target to be simulated may be defined by defining start coordinates 34 and stop coordinates 36 accordingly. For instance, the symbol 24 is selected by using the pointing device 20, for example performing a clicking, and moved within the two-dimensional representation along one axis or two axes. When the symbol 24 is released, the stop coordinates 36 of the movement are set at the position in the two-dimensional representation at which the symbol 24 was released. As shown in FIG. 4, a track 38 is generated that corresponds to the movement of the target to be simulated.

Alternatively, the symbol 24 is selected and the track 38 is generated when moving within the two-dimensional representation via the pointing device 20. The track 38 is ended by performing an action, for instance a clicking, such that the stop coordinates are defined appropriately.

Since the dimensions of the two-dimensional representation are associated with the range and the Doppler, the track provided, namely the movement of the target to be simulated, relates to an acceleration as well as a changing distance.

Accordingly, the graphical user interface 18 provides several symbols 24-38 associated with the target(s) to be simulated, namely symbols 24 representing the target(s) as well as action symbols 26-38 associated with a certain action such as enabling, disabling a certain target. Generally, the user may drag and drop the symbol(s) 24-38, activate and/or deactivate the target(s) by interacting with the corresponding symbol(s) 24-38.

In contrast to the graphical user interface 18 shown in FIG. 4, FIG. 5 shows a graphical user interface 18' known in the state of the art which comprises several columns-like lists to be filled in order to define the target(s) to be simulated.

The graphical user interface 18 according to the present disclosure corresponds to an overview known from a measurement performed by the radar device to be tested. Therefore, the user is used to the illustration provided by the graphical user interface 18 such that the target(s) can be defined easily and intuitively. In some embodiments, the target(s) are defined graphically in a similar manner as they would be illustrated in a measurement.

Therefore, the graphical user interface 18 of the present disclosure provides an editor for defining the target(s) to be simulated. The editor is a so-called WYSIWYG-editor, namely a "What You See Is What You Get"-editor.

Besides the separately formed pointing device 20, the input module 14 may be integrated within the display module 12 such that the user is enabled to make the respective inputs by interacting with the display module 12.

Hence, the graphical user interface 18 is a bidirectional one as the graphical user interface 18 provides an input interface and an output interface simultaneously. The user is enabled to make inputs via the graphical user interface 18, thereby generating the input signal that is processed by the processing module 16, wherein the results of the processing are forwarded from the processing module 16 to the display module 12 for being illustrated accordingly, namely within the graphical user interface 18.

In some embodiments, the display module 12 may comprise a touch-sensitive display 40 that is enabled to sense a touching of the graphical user interface 18 in order to generate the input signal that is processed by the processing module 16. In other words, the input module 14 may be provided by the display module 12 having the touch-sensitive display 40 in an integrated manner. Hence, the separately formed pointing device 20 used as input module 14 is only illustrated by dashed lines. Via the touch-sensitive display 40, the user is also enabled to perform the input mentioned above by simply interacting with the touch-sensitive display 40. Hence, the touch-sensitive display 40 provides the input module 14.

For example, the user touches a location on the touch-sensitive display 40 that is associated with a certain position in the two-dimensional representation provided by the graphical user interface 18. The location touched is sensed by the touch-sensitive display 40, thereby generating the at least one input signal that is received by the processing module 16. The processing module 16 processes the at least one input signal, thereby generating the symbol 24 of the target defined which is illustrated in the graphical user interface 18.

Furthermore, the user may also drag and drop the symbol(s) 24, activate and/or deactivate the target(s) by interacting, for example tipping, the corresponding symbol(s) 24, for example the action symbols associated therewith such as the symbols 26-38 discussed above with regard to FIG. 4.

The touch-sensitive display 40 enables to directly interact with the graphical user interface 18 such that a direct graphical feedback can be provided.

A haptic feedback unit 42 may be also provided such that a (simulated) mechanical feedback is outputted, resulting in a haptic feedback to the user when interacting with the graphical user interface 18, for example via the touch-sensitive display 40.

Figure 2:
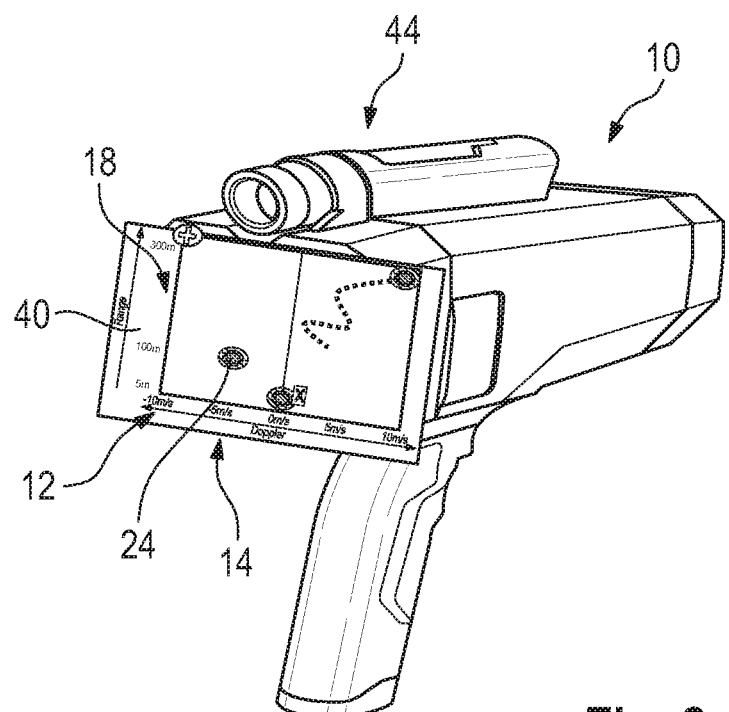
FIG. 2 shows a radar target simulator according to an embodiment of the present disclosure.

In FIG. 2, a certain embodiment is shown in which the radar target simulator 10 is provided by a handheld device 44. The handheld radar target simulator 10 has a display module 12 integrally formed with the input module 14, wherein the graphical user interface 18 is provided.

The display module 12 comprises the touch-sensitive display 40 such that the user is enabled to control the radar target simulator 10 by a single hand. In some embodiments, the user may use its thumb in order to define the target(s) or rather the entire target scenario while interacting with the touch-sensitive display 40.

Figure 3:
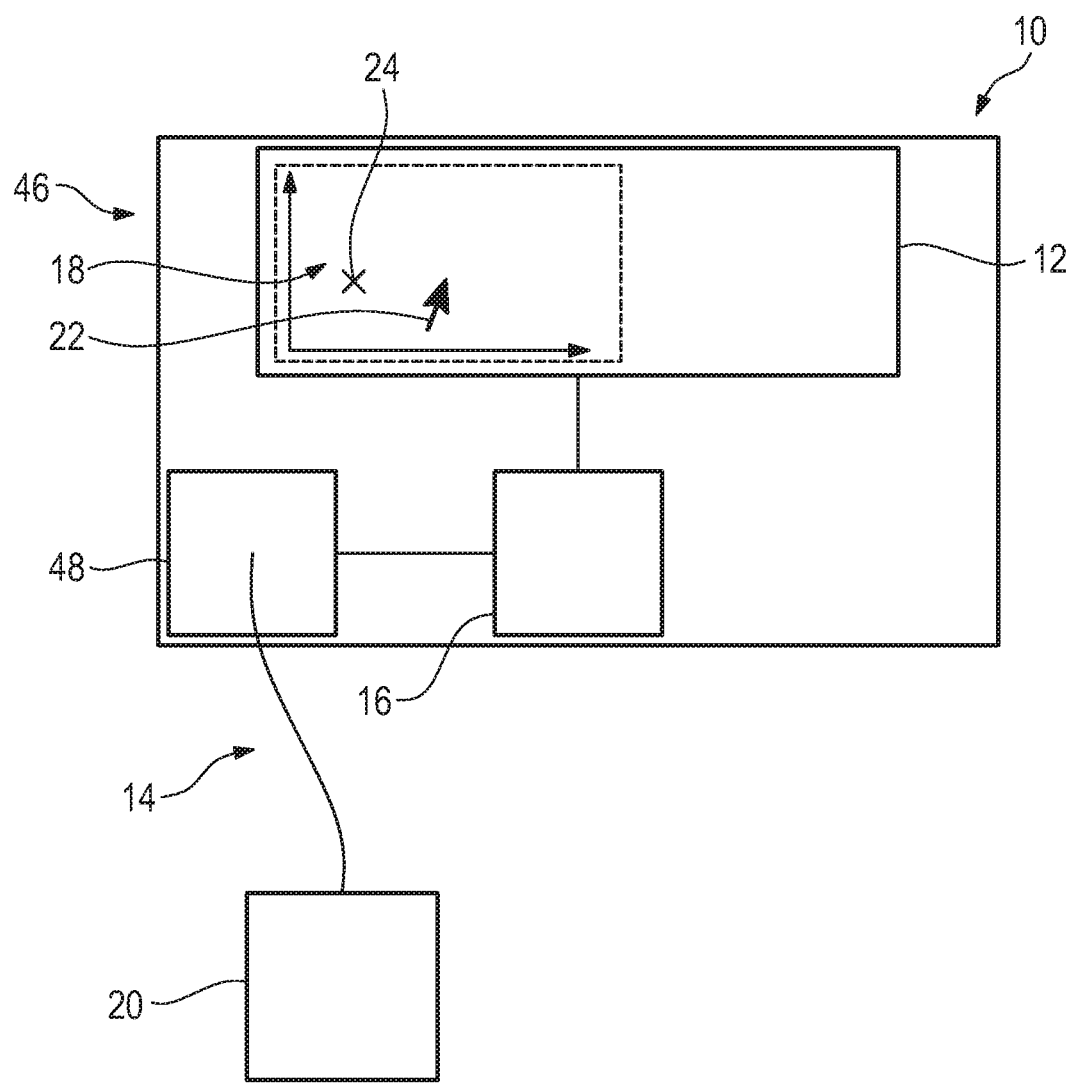
FIG. 3 schematically shows a radar target simulator according to another embodiment of the present disclosure.

In FIG. 3, another embodiment is shown in which the radar target simulator 10 comprises a main device 46 encompassing the display module 12 and the processing module 16. The main device 46 comprises an interface 48 via which the separately formed pointing device 20 is connected such that the pointing device 20 is connected with the processing module 14 in a signal transmitting manner. For instance, the separately formed pointing device 20 is a computer mouse or any other separate device that can be controlled by the user in order to interact with the graphical user interface 18 displayed on the display module 12.

A movement of the pointing device 20 is tracked by the processing module 16 such that the pointer or cursor 22 generated by the processing module 16 is illustrated in the two-dimensional representation provided by the graphical user interface 18 as discussed previously. The user may move the separately formed pointing device 20 wherein the movement of the pointing device 20 is displayed accordingly. Hence, the user is enabled to interact with the graphical user interface 18 in the way described above.

In any case, the user is enabled to define the target(s) to be simulated by using the input module 14 that may be assigned to the main device 46, for instance by knobs, buttons or the like, be separately formed, for instance by a mouse, or be integrated in the display module 12 while interacting with the graphical user interface 18 illustrated.

The graphical user interface 18 provides the two-dimensional representation of an at least two-dimensional space wherein the dimensions are associated with properties of the target(s) to be simulated.

When using the input module 14, the at least one input signal is generated that is processed by the processing module 16 which receives the at least one input signal from the input module 14 based on an input of the user, wherein the input of the user is associated with input coordinates in the two-dimensional representation.

The processing module 16 processes the at least one input signal received, thereby generating the symbol 24 of the target defined which is illustrated by the display module 12 in the two-dimensional representation provided by the graphical user interface 18 such that the user directly receives a graphical feedback.

Due to embodiments of the graphical user interface 18, the user is enabled to directly define the target(s) by the result(s) obtained when performing the respective measurement. In other words, the user is enabled to define what the user gets when performing the measurement while adapting via the graphical user interface 18 what he sees. Hence, the radar target simulator 10 provides a so-called "What You See Is What You Get"-editor (WYSIWYG-editor).

The radar target simulator 10 provided can be used by a user that has less experience in defining target(s) or rather a target scenario for performing a measurement of a radar device since the definition can be performed in an easy and intuitive manner.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the methodologies and technologies described herein can be implemented by special purpose hardware-based computer systems or circuits, etc., or combinations of special purpose hardware and computer instructions.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A radar target simulator for simulating a radar target, the radar target simulator comprising:
   a display and an input via which a user of the radar target simulator is enabled to define a target to be simulated, and
   a processing circuit that is connected with the display and the input in a signal transmitting manner, the display and the processing circuit together providing a graphical user interface for the user of the radar target simulator, the graphical user interface providing a two-dimensional representation of an at least two-dimensional space,
   wherein the processing circuit is configured to:
   receive at least one input signal from the input based on an input of the user, the input of the user being associated with input coordinates in the two-dimensional representation; and
   process the at least one input signal, thereby generating a symbol of the target defined,
   wherein the display illustrates the symbol generated in the two-dimensional representation provided by the graphical user interface, and
   wherein the display comprises a touch-sensitive display that provides the input of the user when the user touches a location on the touch-sensitive display, wherein the location touched is sensed by the touch-sensitive display for generating the at least one input signal received by the processing circuit and processed by the processing circuit for generating the symbol of the target defined.

2. The radar target simulator according to claim 1, wherein the symbol of the target to be simulated in the graphical user interface provides a graphical feedback to the user concerning the definition of the target to be simulated.

3. The radar target simulator according to claim 1, wherein the graphical user interface together with the processing module ensures that the user of the radar target simulator is enabled to generate the target to be simulated in a graphical manner.

4. The radar target simulator according to claim 1, wherein the input enables to adjust at least one property of the target to be simulated.

5. The radar target simulator according to claim 1, wherein the input enables to adjust at least one property of the target to be simulated during a simulation or a measurement.

6. The radar target simulator according to claim 1, wherein at least one property of the target to be simulated is defined by coordinates of the symbol within the two-dimensional representation.

7. The radar target simulator according to claim 1, wherein at least one property of the target to be simulated is one of the following: radar cross section of the target, target enabling, target disabling, track target, distance or range, velocity or Doppler, azimuth, and elevation.

8. The radar target simulator according to claim 7, wherein the distance or range, velocity or Doppler, azimuth, or elevation of the target to be simulated is set by the position of the symbol of the target to be simulated in the two-dimensional representation.

9. The radar target simulator according to claim 1, wherein the at least two-dimensional space is associated with two of the following dimensions: distance or range, velocity or Doppler, azimuth, and elevation.

10. The radar target simulator according to claim 1, wherein a movement of the target to be simulated is set by moving the symbol of the target to be simulated within the two-dimensional representation, thereby generating a track representing the movement.

11. The radar target simulator according to claim 1, wherein the processing circuit is configured to generate parameters that define the target to be simulated.

12. The radar target simulator according to claim 1, wherein the graphical user interface is a bidirectional graphical user interface as the graphical user interface simultaneously provides an input interface and an output interface.

13. The radar target simulator according to claim 1, wherein the input is integrated within the display.

14. The radar target simulator according to claim 1, wherein the input further comprises a pointing device.

15. The radar target simulator according to claim 1, wherein the pointing device is separately formed, a movement of the pointing device being tracked by the processing circuit that generates a pointer or cursor illustrated in the two-dimensional representation.

16. The radar target simulator according to claim 1, wherein the radar target simulator is a hand-held device.

17. A radar target simulator for simulating a radar target, the radar target simulator comprising:
   a display and an input via which a user of the radar target simulator is enabled to define a target to be simulated, and
   a processing circuit that is connected with the display and the input in a signal transmitting manner, the display and the processing circuit together providing a graphical user interface for the user of the radar target simulator, the graphical user interface providing a two-dimensional representation of an at least two-dimensional space,
   wherein the processing circuit is configured to:
   receive at least one input signal from the input based on an input of the user, the input of the user being associated with input coordinates in the two-dimensional representation; and
   process the at least one input signal, thereby generating a symbol of the target defined,
   wherein the display illustrates the symbol generated in the two-dimensional representation provided by the graphical user interface, and
   wherein the processing circuit and the display ensure that an editor is provided for defining the respective target scenario.

18. A radar target simulator for simulating a radar target, the radar target simulator comprising:
   a display and an input via which a user of the radar target simulator is enabled to define a target to be simulated, and
   a processing circuit that is connected with the display and the input in a signal transmitting manner, the display and the processing circuit together providing a graphical user interface for the user of the radar target simulator, the graphical user interface providing a two-dimensional representation of an at least two-dimensional space, wherein the processing circuit is configured to:
receive at least one input signal from the input based on an input of the user, the input of the user being associated with input coordinates in the two-dimensional representation; and
process the at least one input signal, thereby generating a symbol of the target defined,
wherein the display illustrates the symbol generated in the two-dimensional representation provided by the graphical user interface,
wherein the symbol of the target to be simulated in the graphical user interface provides a graphical feedback to the user concerning the definition of the target to be simulated, and
wherein the graphical user interface together with the processing module ensures that the user of the radar target simulator is enabled to generate the target to be simulated in a graphical manner.

\* \* \* \* \*